US012574955B2

(12) United States Patent
Dong

(10) Patent No.: US 12,574,955 B2
(45) Date of Patent: Mar. 10, 2026

(54) METHOD FOR DETERMINING INFORMATION RELATED TO PERIODIC LOW-LATENCY SERVICE

(71) Applicant: Beijing Xiaomi Mobile Software Co., Ltd., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 347 days.

(21) Appl. No.: 18/252,010

(22) PCT Filed: Nov. 6, 2020

(86) PCT No.: PCT/CN2020/127185
§ 371 (c)(1),
(2) Date: May 5, 2023

(87) PCT Pub. No.: WO2022/094940
PCT Pub. Date: May 12, 2022

(65) Prior Publication Data
US 2024/0015780 A1     Jan. 11, 2024

(51) Int. Cl.
*H04W 72/543* (2023.01)
*H04W 72/04* (2023.01)

(52) U.S. Cl.
CPC ......... *H04W 72/543* (2023.01); *H04W 72/04* (2013.01)

(58) Field of Classification Search
CPC ............... H04W 72/543; H04W 72/04; H04W 28/0236; H04W 24/02; H04W 24/08;
H04W 28/0268; H04W 28/12; H04W 4/24; H04L 47/28; H04L 12/1407
See application file for complete search history.

(56) References Cited

U.S. PATENT DOCUMENTS

| | | | |
|---|---|---|---|
| 2006/0187877 A1 | 8/2006 | Lundby et al. | |
| 2019/0239097 A1* | 8/2019 | Meylan | H04W 24/02 |
| 2020/0008179 A1* | 1/2020 | Lee | H04W 72/04 |
| 2020/0029350 A1 | 1/2020 | Asterjadhi et al. | |
| 2020/0296592 A1 | 9/2020 | Höhne et al. | |
| 2021/0058812 A1* | 2/2021 | Chai | H04W 72/21 |
| 2022/0104160 A1* | 3/2022 | Tang | H04W 56/00 |
| 2024/0267793 A1* | 8/2024 | Yu | H04W 28/0236 |

FOREIGN PATENT DOCUMENTS

| | | | |
|---|---|---|---|
| CN | 106488384 A | 3/2017 | |
| CN | 106488410 A | 3/2017 | |
| CN | 107040557 A | 8/2017 | |
| CN | 108243484 A | 7/2018 | |
| CN | 110876165 A | 3/2020 | |

(Continued)

OTHER PUBLICATIONS

WO_2019/213924_A1 (Year: 2019).*

(Continued)

*Primary Examiner* — Rushil P. Sampat
(74) *Attorney, Agent, or Firm* — McCoy Russell LLP

(57) ABSTRACT

A communication method includes: determining a first message frame, where the first message frame includes information related to a periodic low-latency service, and the information is configured to indicate the periodic low-latency service sent by a station; and sending the first message frame.

20 Claims, 4 Drawing Sheets

(56)         References Cited

FOREIGN PATENT DOCUMENTS

| EP | 3654723 A1 | 5/2020 |
| WO | 2017036328 A1 | 3/2017 |
| WO | 2020197260 A1 | 10/2020 |
| WO | 2020204343 A1 | 10/2020 |

OTHER PUBLICATIONS

WO_2020/034911_A1 (Year: 2020).*

"802.11ax-2021—IEEE Standard for Information Technology—Telecommunications and Information Exchange between Systems Local and Metropolitan Area Networks-Specific Requirements Part 11: Wireless LAN Medium Access Control (MAC) and Physical Layer (PHY) Specifications Amendment 1: Enhancements for High-Efficiency WLAN," IEEE Website, Available Online at https://ieeexplore.ieee.org/document/9442429, May 19, 2021, 767 pages.

* cited by examiner

METHOD FOR DETERMINING INFORMATION RELATED TO PERIODIC LOW-LATENCY SERVICE

CROSS REFERENCE TO RELATED APPLICATION

The present application is a U.S. National Phase of International Application No. PCT/CN2020/127185 entitled "COMMUNICATION METHOD AND COMMUNICATION DEVICE" and filed on Nov. 6, 2020. The entire contents of the above-listed application are hereby incorporated by reference for all purposes.

BACKGROUND

The Institute of Electrical and Electronics Engineers (IEEE) established the Task Group (TG) IEEE802.11be to study the next generation (IEEE802.11a/b/g/n/ac) Wi-Fi technology. The scope of the study is: 320 MHz bandwidth transmission, aggregation, and cooperation at a plurality of frequency bands, etc., which is expected to improve at least four times the rate and throughput relative to an existing IEEE802.11ax standard, and its main application scenarios are video transmission, augmented reality (AR), virtual reality (VR), etc.

The aggregation and cooperation of the plurality of frequency bands refers to the communication between devices at 2.4 GHz, 5.8 GHZ, and 6-7 GHz frequency bands at the same time, and a new media access control (MAC) mechanism needs to be defined to manage the communication between the devices at the plurality of frequency bands at the same time. In addition, low-latency transmission is further expected to be supported in IEEE802.11be.

In the discussion of the IEEE802.11be standard, the maximum bandwidth that will be supported is 320 MHz (160 MHz+160 MHz), and in addition, 240 MHz (160 MHz+80 MHz) and the bandwidth supported in the IEEE802.11ax standard may be supported.

In the IEEE802.11be standard, transmission of time sensitive network (TSN) data will be supported, which generally needs a latency of less than or equal to 1 ms; or transmission of data such as AR/VR is supported, which generally needs a latency between 1 ms and 10 ms; and in addition, transmission of data such as interactive video or autonomous driving control generally needs a latency between 10 ms and 50 ms.

SUMMARY

All aspects of the disclosure will at least solve the above problems and/or defects. Various examples of the disclosure provide the following technical solutions.

According to an example of the disclosure, a communication method is provided. The communication method may be applied to a station, and may include: determining a first message frame, where the first message frame includes: information related to a periodic low-latency service, and the information is configured to indicate the periodic low-latency service sent by the station; and sending the first message frame.

According to an example of the disclosure, a communication method is provided. The communication method may be applied to an access point, and may include: receiving a first message frame from a station, where the first message frame includes: information related to a periodic low-latency service, and the information is configured to indicate the periodic low-latency service sent by the station; and determining a third message frame based on the information related to the periodic low-latency service, where the third message frame is configured to allocate transmission resources for the station periodically.

According to an example of the disclosure, an electronic device is provided. The electronic device includes a memory, a processor, and a computer program stored on the memory and capable of running on the processor. The processor, when executing the computer program, implements the method as described above.

According to an example of the disclosure, a non-transitory computer-readable storage medium is provided. The non-transitory computer-readable storage medium stores a computer program. The computer program, when executed by a processor, implements the method as described above.

BRIEF DESCRIPTION OF THE DRAWINGS

By a detailed description of examples of the disclosure with reference to accompanying drawings, the above and other features of examples of the disclosure will be more apparent.

DETAILED DESCRIPTION

Figure 1:
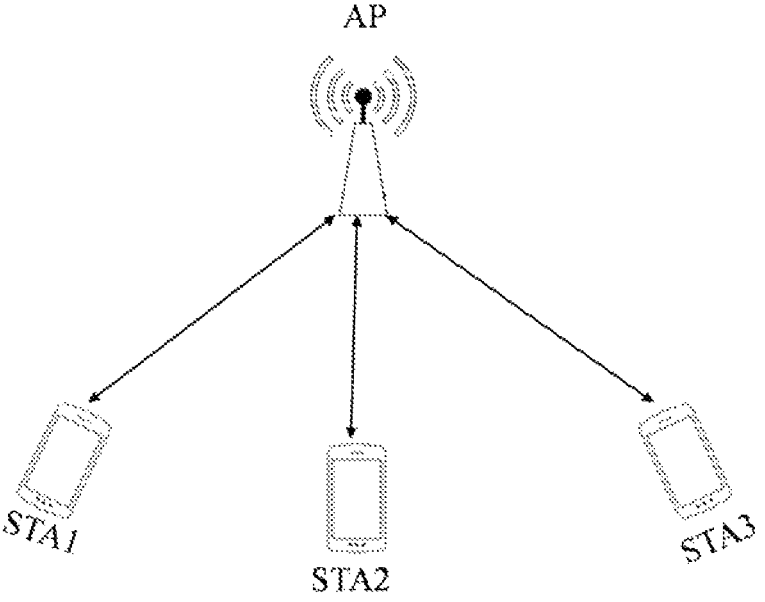
FIG. 1 shows an example schematic diagram of a wireless communication scenario according to an example of the disclosure.

A following description with reference to accompanying drawings is provided to aid in a full understanding of various examples of the disclosure as limited by the appended claims and their equivalents. Various examples of the disclosure include various specific details, but these specific details are merely considered to be examples. In addition, for clarity and conciseness, a description of well-known technologies, functions, and constructions may be omitted.

Terms and words used in the disclosure are not limited to written meanings, but are merely used by the inventor to enable a clear and consistent understanding of the disclosure. Accordingly, to those skilled in the art, the description of the various examples of the disclosure is provided merely for an illustrative purpose, but not for a purpose of limitation.

It is to be understood that, unless a context clearly indicates otherwise, singular forms "one", "a", "said" and "the" used here may also include plural forms. It is to be further understood that an expression "include" as used in the disclosure refers to presence of described features, integers, steps, operations, elements and/or components, but does not exclude presence or addition of one or more other features, integers, steps, operations, elements, components and/or their groups.

It will be understood that while terms "first", "second", etc. may be used here for describing various elements, these elements are not to be limited by these terms. These terms are merely used to distinguish one element from another.

Accordingly, without departing from teachings of the examples, a first element discussed below may be referred to as a second element.

It is to be understood that when an element is said to be "connected" or "coupled" to another element, it may be directly connected or coupled to other elements, or there may be intermediate elements. In addition, "connected" or "coupled" as used here may include a wireless connection or wireless coupling. A term "and/or" or an expression "at least one of . . . /at least one" as used here includes any and all combinations of one or more relevant listed items.

Unless otherwise defined, all terms used here (including technical terms and scientific terms) have the same meaning as generally understood by those ordinarily skilled in the art to which the disclosure pertains.

In existing standards, a buffer status report (BSR) mechanism is defined to enable a station to obtain uplink transmission resources, i.e., when the station has data to send, it carries the size of a cached uplink data frame in an A-control domain of a data frame or a management frame. The specific definition of a control information subdomain in the BSR may be shown in Table 1 below:

TABLE 1

| Format of BSR control information subdomain | | | | | |
|---|---|---|---|---|---|
| B0 B3<br>ACI Bitmap | B4 B5<br>Delta TID | B6 B7<br>ACI Hight | B8 B9<br>Scaling<br>Factor | B10 B17<br>Queue Size<br>High | B18 B25<br>Queue Size<br>All |
| Bits: 4 | 2 | 2 | 2 | 8 | 8 |

However, since the BSR or buffer status report poll (BSRP) mechanism as shown in Table 1 does not satisfy latency requirements of each service in the IEEE802.11be standard, and the granularity of the queue size is not clear, the above mechanism of the existing standard cannot satisfy the requirements of a periodic low-latency service.

The disclosure relates to the field of communications, in particular to a communication method and a communication device in wireless communications.

FIG. 1 shows an example schematic diagram of a wireless communication scenario.

In a wireless local area network, a basic service set (BSS) may be composed of an access point (AP) and one or more stations (STAs) that communicate with the AP. The basic service set may be connected to a distribution system (DS) through its AP and then access another basic service set to compose an extended service set (ESS).

The AP is a wireless switch configured to a wireless network and is also the core of the Network. An AP device may be configured as a wireless base station, and mainly configured as a bridge connecting the wireless network and a wired network. With this access point (AP), the wired and wireless networks may be integrated.

As an example, the AP may include a software application and/or a circuit to enable other categories of nodes in the wireless network to communicate with the outside and inside of the wireless network through the AP. For example, the AP may be a terminal device, or a network device provided with a wireless fidelity (Wi-Fi) chip.

As examples, the station (STA) may include but is not limited to: a cellular phone, a smart phone, a wearable device, a computer, a personal digital assistant (PDA), a personal communication system (PCS) device, a personal information manager (PIM), a personal navigation device (PND), a global positioning system, a multimedia device, an Internet of Things (IoT) device, etc.

Although it is shown in FIG. 1 that one AP communicates with three stations (STA1, STA2 and STA3), this is merely an example, and the examples of the disclosure are not limited to this, for example, the AP and the stations may have any quantity and/or any category.

Figure 2:
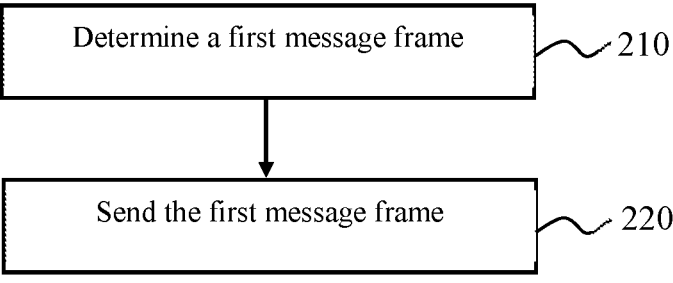
FIG. 2 shows a flowchart of a communication method according to an example of the disclosure.

FIG. 2 shows a flowchart of a communication method according to an example. The communication method shown in FIG. 2 may be applied to a station.

Referring to FIG. 2, a first message frame may be determined in step 210. In the example of the disclosure, there may be a variety of modes to determine the first message frame, for example, the station may generate the first message frame according to at least one of the following: network conditions, load conditions, a hardware capability of a sending/receiving device, a service category, or a relevant protocol provision, which is not specifically limited by the example of the disclosure. In the example of the disclosure, the station may further obtain the first message frame from an external device, which is not specifically limited by the example of the disclosure.

According to the example of the disclosure, the first message frame may include information related to a periodic low-latency service, and the information is configured to indicate the periodic low-latency service sent by the station. The periodic low-latency service may refer to a service that needs to be sent periodically with a very low-latency requirement. In the example of the disclosure, examples of the periodic low-latency service may include: transmission of TSN data supported in an IEEE802.11be standard (which generally needs a latency of less than or equal to 1 ms); transmission of data such as AR/VR (which generally requires a latency between 1 ms and 10 ms); or transmission of data such as interactive video or autonomous driving control (which generally needs a latency between 10 ms and 50 ms). According to the example of the disclosure, the information indicating the periodic low-latency service corresponding to these data to be sent by the station may be carried in the first message frame.

The station may transmit the periodic low-latency service in one transmission opportunity (TXOP) or a plurality of TXOPs allocated to it by an access point. To satisfy the requirements for low-latency transmission of the data such as that described above, the content in a BSR is redefined according to the example of the disclosure to identify the size of resources needed to transmit such service. In the example of the disclosure, the information related to the periodic low-latency service included in the first message frame may include at least one of the following: a size of the periodic low-latency service; a periodic interval of the periodic low-latency service; an access category corresponding to the periodic low-latency service; a traffic identifier corresponding to the periodic low-latency service; time information; or a number of transmissions of the periodic low-latency service. However, this is merely an example, the example of the disclosure is not limited to this, and other information needed to transmit the data may also be included in the first message frame. For example, the information configured to indicate the early termination of the periodic low-latency service may further be included in the first message frame, and in this case, the periodic low-latency service may also be terminated early voluntarily even when the number of transmissions is not met. As another example, the station may carry the information configured to indicate the early termination of the periodic low-latency service in other frames different from the first message frame, so that it may terminate the periodic low-latency service early voluntarily. In the example of the disclosure, the information configured to indicate the early termination of the periodic low-latency service may be included in an A-control domain or an extended A-control domain of the corresponding frame (for example, the first message frame or other frames), or the corresponding frame may contain the information configured to indicate the early termination of the periodic low-latency service by carrying default information.

According to the example of the disclosure, the information related to the periodic low-latency service (i.e., a BSR) included in the first message frame may be as shown in Table 2 below.

TABLE 2

| Information related to periodic low-latency service (BSR) | | | | | |
|---|---|---|---|---|---|
| Size | INT | Access category | Traffic identifier (TID) | Time Info | Number of Transmission |

In the example of the disclosure, the size of the periodic low-latency service may indicate a size of a data volume of the service to be transmitted. The periodic interval corresponding to the periodic low-latency service may be configured to identify: a time interval between sending two adjacent periodic low-latency services. The access category corresponding to the periodic low-latency service and the traffic identifier corresponding to the periodic low-latency service may be similar to an ACI bitmap and Delta TID shown in Table 1 above respectively, which is not described in detail here for brevity. The time information may be configured to identify: a time point at which the periodic low-latency service is sent after the first message frame is sent, for example, the time information may indicate the time interval between the time point at which the first message frame is sent completely and the time point at which the periodic low-latency service begins to be sent. The number of transmissions of the periodic low-latency service may be configured to identify: a number of continuous transmissions needed for the periodic low-latency service, for example, the number of continuous transmissions needed for the periodic low-latency service during one or more TXOPs allocated to the station by the access point.

The periodic low-latency service to be sent by the station may include one or more services, and the information related to the periodic low-latency service may include the size, periodic interval, access category, traffic identifier, time information, and a number of transmissions related to each service.

In the example of the disclosure, the information related to the periodic low-latency service (i.e., the BSR) may be included in the first message frame. For example, the information related to the periodic low-latency service (i.e., the BSR) may be included in the A-control domain of the first message frame, specifically, the A-control domain may be an early identification domain for the periodic low-latency service, i.e., it may be configured to pre-identify the periodic service before sending the periodic service. For example-again, the information related to the periodic low-latency service (i.e., the BSR) may be included in an MAC frame header part of the first message frame, in which case the first message frame may be a data frame or a management frame.

Continuing referring to FIG. 2, in step 220, the first message frame may be sent. For example, the station may send the first message frame to the access point, and the access point, after receiving the first message frame, may allocate uplink transmission resources to the station periodically according to the information it carries related to the periodic low-latency service.

Although merely steps 210 and 220 are shown in FIG. 2, the example of the disclosure is not limited to this. For example, the communication method shown in FIG. 2 may further include: a second message frame is sent, where, the second message frame may include an extreme high throughput (EHT) capability element of the station. The EHT capability element may indicate information about the capability of the station to be able to support the (periodic) low-latency service. It is to be understood that the second message frame here is not sent after the first message frame, but may be sent during a process of an association (e.g., an initial association) of the station with the access point; and the first message frame sent in step 220 may be sent during a process of interaction of the station with the access point. This will be described in detail later with reference to FIG. 4.

As an example, the second message frame may be a probe request frame or an association request frame, i.e., the EHT capability element may be encapsulated in the probe request frame or the association request frame. According to the example, a specific definition of the EHT capability element may be as shown in Table 3 below.

TABLE 3

| EHT capability element | | | | |
|---|---|---|---|---|
| Element | Element ID | Element ID extension | Extensible | Fragmentable |
| EHT capability element | 255 | 61 | Yes | NO |

In Table 3, a value of the element ID is 255, and a value of the element ID extension is 61, configured to identify a category of the element as the EHT capability element; and extensible and fragmentable are configured to identify the element as having attributes of extensible as well as non-fragmentable sending. It will be understood that the values in all parts of Table 3 are merely examples, and the example of the disclosure is not limited to this, and other suitable values are also feasible.

According to the example, the EHT capability element described in Table 3 is extensible. Accordingly, although not shown, the EHT capability element may include a capability identification bit that may represent an early identifier that the station supports the periodic low-latency service and/or a low-latency service in one or more TXOPs. As an example, the EHT capability element may include at least one of: a first identifier configured to indicate that the station supports the low-latency service; or a second identifier configured to indicate that the station supports the periodic low-latency service. In the example of the disclosure, the low-latency service may represent a data transmission service that has a strict latency requirement but does not need to be sent periodically, while the periodic low-latency service may represent a data transmission service that has a strict latency requirement and needs to be sent periodically.

Combined with Table 2 and Table 3, the communication method shown in FIG. 2 may satisfy the latency requirements of different services and improve the throughput of a system.

Figure 3:
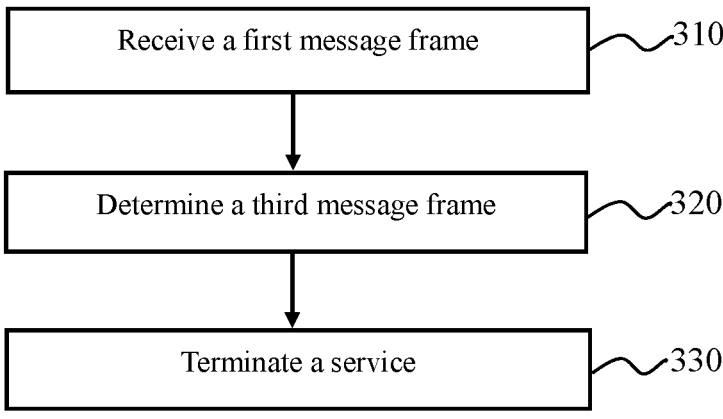
FIG. 3 shows a flowchart of another communication method according to an example of the disclosure.

FIG. 3 shows a flowchart of a communication method according to an example. The communication method shown in FIG. 3 may be applied to an access point.

Referring to FIG. 3, a first message frame may be received from a station in step 310. According to the example, the first message frame may include information related to a periodic low-latency service, and the information is configured to indicate the periodic low-latency service sent by the station. The information related to the periodic low-latency service included in the first message frame may be as shown in Table 2 above, and the first message frame may further include the EHT capability element as shown in Table 3 above, the repetitive description of which is omitted here for brevity.

In step 320, a third message frame may be determined based on the information related to the periodic low-latency service, where, the third message frame is configured to allocate transmission resources for the station periodically. In the example of the disclosure, the access point may pre-allocate uplink resources of the periodic low-latency service in one or more TXOPs for the station according to a latency need of the service (i.e., the information related to the periodic low-latency service) to satisfy the requirements of the low-latency service.

In the example of the disclosure, the access point may be a multi-link device (MLD), i.e., the access point may support transmission of data and information over a plurality of connections. For example, the plurality of connections may be a plurality of connections at different frequencies, for example, connections at 2.4 GHz, 5 GHz, 6 GHz, etc. or several connections at 2.4 GHz with the same or different bandwidths. In this case, the communication method shown in FIG. 3 may further include: the third message frame is determined under other connection in response to the access point not being able to allocate transmission resources under a connection configured to receive the first message frame. For example, when the first message frame is received under a 2.4 GHz connection, but the transmission resources under the 2.4 GHz connection cannot satisfy the latency requirements of the service, then the third message frame may be determined under a 5 GHz connection and/or a 6 GHz connection to allocate the transmission resources for the station. In this example, the third message frame may carry allocated resource information, and in addition, in some examples, the third message frame may include connection identifiers of the other connections.

Continuing referring to FIG. 3, in step 330, the periodic low-latency service may be terminated. In one example, in response to a number of the transmission resources allocated by the access point reaching a number of transmissions of the periodic low-latency service, the periodic low-latency service is terminated. For another example, the first message frame may include information configured to indicate early termination of the periodic low-latency service, and in this case, in step 330, the periodic low-latency service may be terminated in response to the information configured to indicate the early termination of the periodic low-latency service. In this case, it is possible to disregard whether the number of the transmission resources allocated by the access point reaches the number of transmissions of the periodic low-latency service. As a further example, an additional frame (different from the first message frame) may be received from the station, the frame may include the information for indicating the early termination of the periodic low-latency service, and when such information is received, the periodic low-latency service may be terminated early.

Although merely step 310 to step 330 are shown in FIG. 3, the example of the disclosure is not limited to this. For example, the communication method shown in FIG. 3 may further include: a fourth message frame is sent, where, the fourth message frame may include an EHT capability element of the access point. The EHT capability element may indicate information about the capability of the access point to be able to support the (periodic) low-latency service. It is to be understood that the fourth message frame here is not sent after the third message frame, but may be sent during a process of an association (e.g., an initial association) of the station with the access point; and the third message frame sent in step 320 may be sent during a process of interaction of the station with the access point. This will be described in detail later with reference to FIG. 4.

As an example, the fourth message frame may be a beacon frame, a probe response frame, or an association response frame, i.e., the EHT capability element may be encapsulated in the beacon frame, the probe response frame, or the association response frame. The fourth message frame may have a format similar to that shown in Table 3, the repetitive description of which is omitted here for brevity. According to the example of the disclosure, the EHT capability element included in the fourth message frame may include a capability identification bit that represents an early identifier that the access point supports the periodic low-latency service and/or the low-latency service. As an example, the EHT capability element may include at least one of: a third identifier configured to indicate that the access point supports the low-latency service; or a fourth identifier configured to indicate that the access point supports the periodic low-latency service.

The station and the access point are informed of whether the other side supports the (periodic) low-latency service through the second message frame and the fourth message frame during the initial association phase, and further, during the interaction phase, uplink resources are pre-allocated for the periodic low-latency service through the first message frame and the third message frame to satisfy the requirements of the (periodic) low-latency service.

Figure 4:
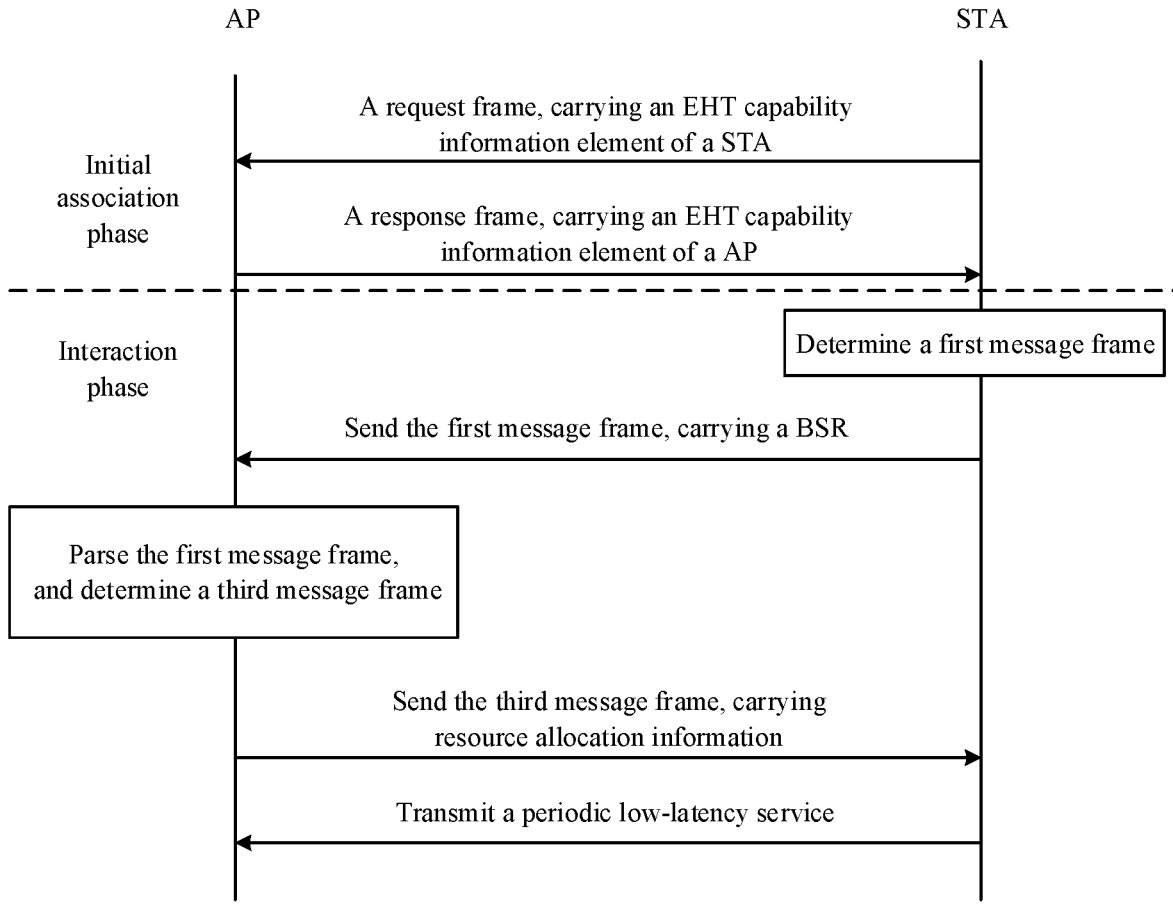
FIG. 4 shows a flowchart of a station communicating with an access point according to an example of the disclosure.

FIG. 4 shows a flowchart of a station communicating with an access point according to an example.

Referring to FIG. 4, during the initial association phase, the STA and the AP are informed of information about each other's capability to support a periodic low-latency service through a request frame (e.g., a probe request frame or an association request frame as examples of a second message frame) and a response frame (e.g., a probe response frame or an association response frame as examples of a fourth message frame). However, the example shown in FIG. 4 is an example, the disclosure is not limited to this, for example, the AP may first broadcast a beacon frame (i.e., the fourth message frame) carrying an EHT capability information element of the AP to the STA, and then the STA may send the association request frame (i.e., the second message frame) carrying an EHT capability information element of the STA to the node AP, thus being informed of each other's capability information during the initial association phase.

The EHT capability information element may be as shown in Table 3, the repetitive description of which is omitted here for brevity.

During the interaction phase, the STA and the AP may pre-allocate uplink resources for the periodic low-latency service through a first message frame and a third message frame, and then perform transmission of the periodic low-latency service in one or more TXOPs. The information related to the periodic low-latency service may be carried in the first message frame, which may be as shown in Table 2, the repetitive description of which is omitted here for brevity.

Although not shown in FIG. 4, the AP may terminate transmission of the periodic low-latency service as shown in step 330 of FIG. 3, the repetitive description of which is omitted here for brevity.

Figure 5:
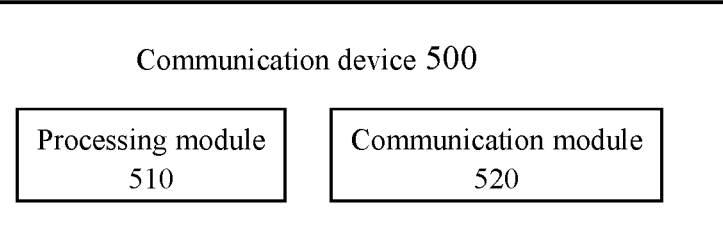
FIG. 5 shows a block diagram of a communication device according to an example of the disclosure.

FIG. 5 shows a block diagram of a communication device according to an example of the disclosure. The communication device 500 shown in FIG. 5 may be applied to a station.

Referring to FIG. 5, the communication device 500 may include a processing module 510 and a communication module 520.

The processing module 510 may be configured to: determine a first message frame, where, the first message frame may include: information related to a periodic low-latency service, and the information is configured to indicate the periodic low-latency service sent by the station. The first message frame may be similar to descriptions in FIG. 2 and Table 2, the repetitive description of which is omitted here for brevity. The communication module 520 may be configured to: send the first message frame.

According to the example, the processing module 510 may further be configured to control the communication module 520 to send a second message frame, and the second message frame may include an extreme high throughput capability element of the station. The extreme high throughput capability element of the station may be similar to descriptions in FIG. 2 and Table 3, the repetitive description of which is omitted here for brevity.

The communication device 500 may execute the communication method described with reference to FIG. 2, the repetitive description of which is omitted here for brevity. In addition, the communication device 500 shown in FIG. 5 is merely an example, and the example of the disclosure is not limited to this, for example, the communication device 500 may further include other modules, for example, a memory module, etc. In addition, individual modules in the communication device 500 may be combined into more complex modules, or may be divided into more independent modules to support various functions.

Figure 6:
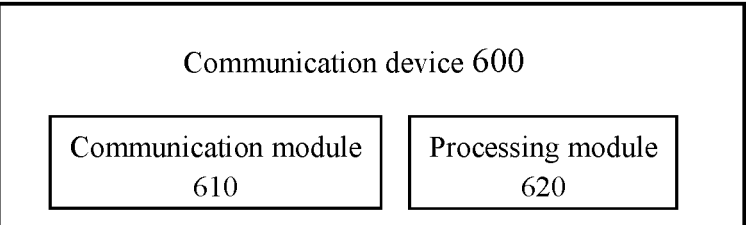
FIG. 6 shows a block diagram of another communication device according to an example of the disclosure.

FIG. 6 shows a block diagram of another communication device according to an example of the disclosure. The communication device 600 may be applied to an access point.

Referring to FIG. 6, the communication device 600 may include a communication module 610 and a processing module 620.

The communication module 610 may be configured to: receive a first message frame from the station, where, the first message frame includes: information related to a periodic low-latency service, and the information is configured to indicate the periodic low-latency service sent by a station. The first message frame may be similar to descriptions in FIG. 2 and Table 2, the repetitive description of which is omitted here for brevity.

The processing module 620 may be configured to: determine a third message frame based on the information related to the periodic low-latency service, where, the third message frame is configured to periodically allocate transmission resources for the station periodically. The third message frame may be similar to the description in FIG. 3, the repetitive description of which is omitted here for brevity.

According to the example, the processing module 620 may further be configured to: terminate the periodic low-latency service in response to a number of transmission resources allocated by the access point reaching a number of transmissions of the periodic low-latency service.

According to the example, in response to the first message frame or other message frames received by the communication module 610 including information configured to indicate early termination of the periodic low-latency service, the processing module 620 may terminate the periodic low-latency service early.

According to the example, the processing module 620 may further be configured to control the communication module 610 to send a fourth message frame, where, the fourth message frame includes an extreme high throughput capability element of the access point. The extreme high throughput capability element of the access point may be similar to descriptions in FIG. 3 and Table 3, the repetitive description of which is omitted here for brevity.

The communication device 600 may execute the communication method described with reference to FIG. 3, the repetitive description of which is omitted here for brevity. In addition, the communication device 600 shown in FIG. 6 is merely an example, and the example of the disclosure is not limited to this, for example, the communication device 600 may further include other modules, for example, a memory module, etc. In addition, individual modules in the communication device 600 may be combined into more complex modules, or may be divided into more independent modules to support various functions.

The communication method described in FIG. 2 to FIG. 4 and the communication device described in FIG. 5 and FIG. 6 according to the examples of the disclosure can pre-allocate uplink resources of the periodic low-latency service for the station according to the service latency needs, thus enabling to satisfy the requirements of the (periodic) low-latency service in the IEEE 802.11be standard and to improve the throughput of a system.

Based on the same principles as the method provided in the examples of the disclosure, an example of the disclosure further provides an electronic device including a processor and a memory; where, machine readable instructions (which may also be referred to as "a computer program") are stored in the memory; and the processor is configured to execute the machine readable instructions to implement the method described with reference to FIG. 2 to FIG. 4.

An example of the disclosure further provides a non-transitory computer-readable storage medium on which a computer program is stored, and the computer program, when executed by a processor, implements the method described with reference to FIG. 2 to FIG. 4.

In the examples, the processor may be configured to implement or execute various exemplary logic boxes, modules, and circuits described in conjunction with the content of the disclosure, for example, a central processing unit (CPU), a general purpose processor, a digital signal processor (DSP), an application specific integrated circuit (ASIC), a field programmable gate array (FPGA), or other programmable logic apparatus, a transistor logic apparatus, a hardware component, or any their combination. The processor may also be a combination that implements a computing function, such as a combination containing one or more microprocessors, a combination of the DSP and the microprocessor, etc.

In the examples, the memory may be, for example, a read only memory (ROM), a random access memory (RAM), an electrically erasable programmable read only memory (EE-PROM), a compact disc read only memory (CD-ROM) or other compact disc storage, optical disc storage (including a compact optical disc, a laser disc, an optical disc, a digital general purpose disc, a Blu-ray disc, etc.), a disc storage medium or other magnetic storage devices, or any other medium that can be configured to carry or store a program code in a form of an instruction or a data structure and that can be accessed by a computer, but is not limited to this.

It is to be understood that although all the steps in the flowcharts of the accompanying drawings are shown sequentially as indicated by arrows, these steps need not be executed sequentially in the order indicated by the arrows. Unless explicitly stated here, these steps are not executed in a strict order and may be executed in other orders. In addition, at least a part of the steps in the flowcharts of the accompanying drawings may include a plurality of sub-steps or a plurality of phases, which need not be executed to completion at the same moment, but may be executed at different moments, the order of their execution needs not be sequential, but they may be executed in turn or alternately with other steps or at least a part of the sub-steps or phases of other steps.

Although the disclosure has been shown and described with reference to certain examples of the disclosure, it will be understood by those skilled in the art that various changes in form and detail may be made without departing from the scope of the disclosure. Accordingly, the scope of the disclosure is not to be limited by the examples, but rather by the appended claims and their equivalents.

Additional non-limiting embodiments of the disclosure include:

In a first aspect, an example of the disclosure provides a communication method, applied to a station, and including:

determining a first message frame, where the first message frame includes information related to a periodic low-latency service, and the information is configured to indicate the periodic low-latency service sent by the station; and sending the first message frame.

In an example, the method may include:

sending a second message frame, where the second message frame includes an extreme high throughput capability element of the station.

In an example, the extreme high throughput capability element includes at least one of following:

a first identifier configured to indicate that the station supports a low-latency service; or a second identifier configured to indicate that the station supports the periodic low-latency service.

In an example, the second message frame is sent during a process of an association of the station with an access point.

In an example, the first message frame is sent during a process of interaction of the station with the access point.

In an example, the information related to the periodic low-latency service includes at least one of following:

a size of the periodic low-latency service;

a periodic interval of the periodic low-latency service;

a category of the access point corresponding to the periodic low-latency service;

12 a traffic identifier corresponding to the periodic low-latency service;

time information; or a number of transmissions of the periodic low-latency service.

In an example, the periodic interval is configured to identify a time interval between sending two adjacent periodic low-latency services.

In an example, the time information is configured to identify a time point at which the periodic low-latency service is sent after the first message frame is sent.

In an example, the number of transmissions is configured to identify a number of continuous transmissions needed for the periodic low-latency service.

In an example, the information related to the periodic low-latency service is included in an A-control domain of the first message frame.

In an example, the information related to the periodic low-latency service is included in an MAC frame header part of the first message frame.

In an example, the first message frame further includes information for indicating an early termination of the periodic low-latency service.

In a second aspect, an example of the disclosure provides a communication method, applied to an access point, and including:

receiving a first message frame from a station, where the first message frame includes information related to a periodic low-latency service, and the information is configured to indicate the periodic low-latency service sent by the station; and determining a third message frame based on the information related to the periodic low-latency service, where the third message frame is configured to allocate transmission resources for the station periodically.

In an example, the method may include:

determining the third message frame under other connection in response to the access point not being able to allocate the transmission resources under a connection configured to receive the first message frame.

In an example, the third message frame includes a connection identifier of the other connection.

In an example, the method may include:

sending a fourth message frame, where the fourth message frame includes an extreme high throughput capability element of the access point.

In an example, the extreme high throughput capability element includes at least one of following:

a third identifier configured to indicate that the access point supports a low-latency service; or a fourth identifier configured to indicate that the access point supports the periodic low-latency service.

In an example, the extreme high throughput capability element of the access point is included in an A-control domain of the fourth message frame.

In an example, the information related to the periodic low-latency service includes at least one of following:

a size of the periodic low-latency service;

a periodic interval of the periodic low-latency service;

a category of the access point corresponding to the periodic low-latency service;

a traffic identifier corresponding to the periodic low-latency service;

time information; or a number of transmissions of the periodic low-latency service.

In an example, the method may include:

terminating the periodic low-latency service in response to a number of the transmission resources allocated by the access point reaching the number of transmissions of the periodic low-latency service.

In an example, the first message frame further includes information configured to indicate an early termination of the periodic low-latency service.

In an example, the method may include:

terminating the periodic low-latency service in response to the information configured to indicate the early termination of the periodic low-latency service.

In a third aspect, an electronic device, including a memory, a processor and a computer program stored on the memory and capable of running on the processor, where when the processor executes the computer program, the method as described in any one of the foregoing technical solutions applied to a station.

In a fourth aspect, a non-transitory computer-readable storage medium, storing a computer program, where the computer program, in response to determining of being executed by a processor, implements the method as described in any one of the foregoing technical solutions applied to a station.

In a fifth aspect, an electronic device, including a memory, a processor and a computer program stored on the memory and capable of running on the processor, where when the processor executes the computer program, the method as described in any one of the foregoing technical solutions applied to an access point.

In a sixth aspect, a non-transitory computer-readable storage medium, storing a computer program, where the computer program, in response to determining of being executed by a processor, implements the method as described in any one of the foregoing technical solutions applied to an access point.

The technical solutions provided in examples of the disclosure can satisfy latency requirements of different services and improve the throughput of a system.

What is claimed is:

1. A communication method, performed by a station, and comprising:

determining a first message frame, wherein the first message frame comprises information related to a periodic low-latency service, and the information is configured to indicate the periodic low-latency service sent by the station;

sending the first message frame; and sending a second message frame, wherein the second message frame comprises an extreme high throughput capability element of the station;

wherein the extreme high throughput capability element comprises an identifier configured to indicate that the station supports the periodic low-latency service.

2. The communication method according to claim 1, wherein the extreme high throughput capability element further comprises:

an identifier configured to indicate that the station supports a low-latency service.

3. The communication method according to claim 1, wherein the second message frame is sent during a process of an association of the station with an access point.

4. The communication method according to claim 1, wherein the first message frame is sent during a process of interaction of the station with an access point.

5. The communication method according to claim 1, wherein the information related to the periodic low-latency service comprises at least one of following:

a size of the periodic low-latency service;

a periodic interval of the periodic low-latency service;

a category of an access point corresponding to the periodic low-latency service;

a traffic identifier corresponding to the periodic low-latency service;

time information; or a number of transmissions of the periodic low-latency service.

6. The communication method according to claim 5, wherein the periodic interval is configured to identify a time interval between sending two adjacent periodic low-latency services, wherein the time information is configured to identify a time point at which the periodic low-latency service is sent after the first message frame is sent, and the number of transmissions is configured to identify a number of continuous transmissions needed for the periodic low-latency service.

7. The communication method according to claim 1, wherein the information related to the periodic low-latency service is comprised in an A-control domain of the first message frame, or the information related to the periodic low-latency service is comprised in an MAC frame header part of the first message frame.

8. The communication method according to claim 1, wherein the first message frame further comprises information for indicating an early termination of the periodic low-latency service.

9. A communication method, performed by an access point, and comprising:

receiving a first message frame from a station, wherein the first message frame comprises information related to a periodic low-latency service, and the information is configured to indicate the periodic low-latency service sent by the station;

determining a third message frame based on the information related to the periodic low-latency service, wherein the third message frame is configured to allocate transmission resources for the station periodically; and sending a fourth message frame, wherein the fourth message frame comprises an extreme high throughput capability element of the access point;

wherein the extreme high throughput capability element comprises an identifier configured to indicate that the access point supports the periodic low-latency service.

10. The communication method according to claim 9, further comprising:

determining the third message frame under other connection in response to the access point not being able to allocate the transmission resources under a connection configured to receive the first message frame, wherein the third message frame comprises a connection identifier of the other connection.

11. The communication method according to claim 9, wherein the extreme high throughput capability element further comprises:

an identifier configured to indicate that the access point supports a low-latency service.

12. The communication method according to claim 9, wherein the information related to the periodic low-latency service comprises at least one of following:

a size of the periodic low-latency service;

a periodic interval of the periodic low-latency service;

a category of the access point corresponding to the periodic low-latency service;

a traffic identifier corresponding to the periodic low-latency service;

time information; or a number of transmissions of the periodic low-latency service.

13. The communication method according to claim 12, further comprising:

terminating the periodic low-latency service in response to a number of the transmission resources allocated by the access point reaching the number of transmissions of the periodic low-latency service.

14. The communication method according to claim 9, wherein the first message frame further comprises information configured to indicate an early termination of the periodic low-latency service.

15. The communication method according to claim 14, further comprising:

terminating the periodic low-latency service in response to the information configured to indicate the early termination of the periodic low-latency service.

16. An electronic device, comprising:

a memory;

a processor; and a computer program stored on the memory and capable of running on the processor, wherein the processor is configured to:

determine a first message frame, wherein the first message frame comprises information related to a periodic low-latency service, and the information is configured to indicate the periodic low-latency service sent by a station;

send the first message frame; and send a second message frame, wherein the second message frame comprises an extreme high throughput capability element of the station;

wherein the extreme high throughput capability element comprises an identifier configured to indicate that the station supports the periodic low-latency service.

17. A non-transitory computer readable storage medium, storing a computer program, wherein the computer program, in response to being executed by a processor, causes the processor to implement the communication method according to claim 1.

18. An electronic device, comprising a memory, a processor, and a computer program stored on the memory and capable of running on the processor, wherein when the processor executes the computer program, the communication method according to claim 9 is implemented.

19. A non-transitory computer-readable storage medium, storing a computer program, wherein the computer program, in response to being executed by a processor, causes the processor to implement the communication method according to claim 9.

20. The communication method according to claim 9, wherein the extreme high throughput capability element of the access point is comprised in an A-control domain of the fourth message frame.

* * * * *